T. J. Lovegrove,
Casting Iron Pipe.
No. 539. Reissued Mar. 23, 1858.
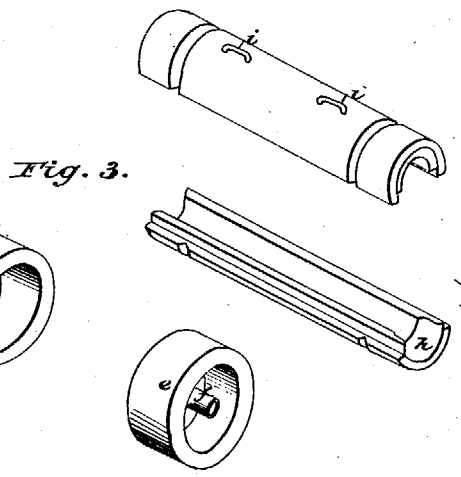
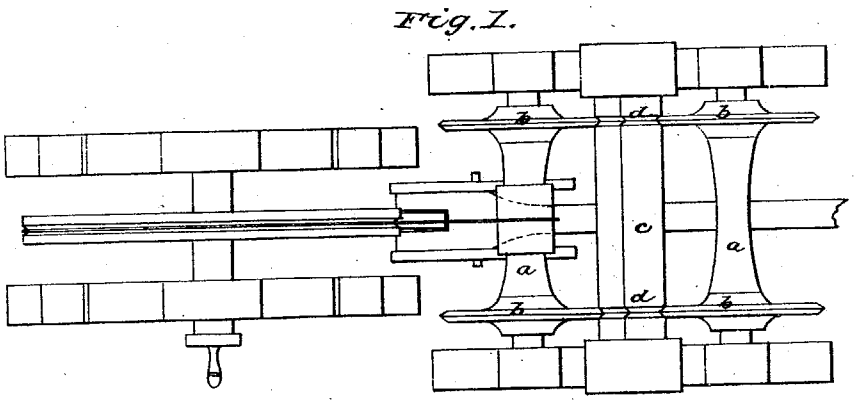
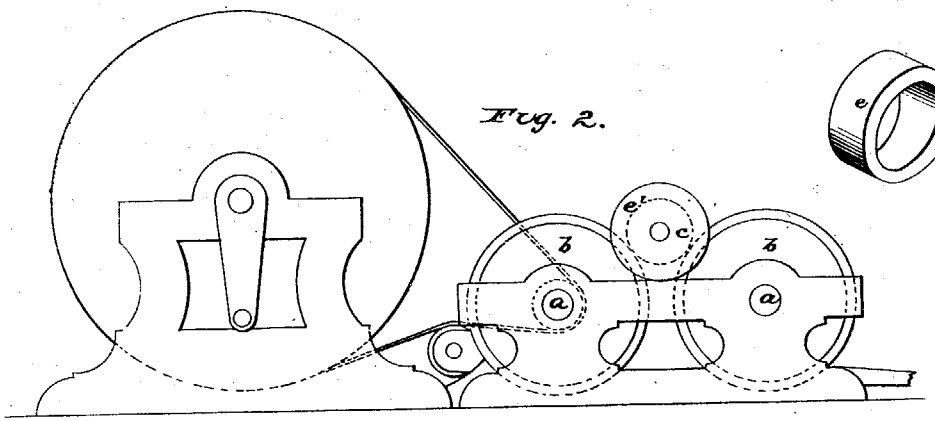

UNITED STATES PATENT OFFICE.

THOS. J. LOVEGROVE, OF BALTIMORE, MARYLAND.

METHOD OF EMPLOYING CENTRIFUGAL FORCE IN CASTING IRON PIPE.

Specification forming part of Letters Patent No. 5,988, dated December 26, 1848; Reissue No. 539, dated March 23, 1858.

*To all whom it may concern:*

Be it known that I, THOMAS J. LOVEGROVE, of the city of Baltimore, in the State of Maryland, have invented certain new and useful Improvements in Casting; and I do hereby declare that the following is a full, clear, and exact description of the principle or character which distinguishes them from all other things before known, and of the manner of making, modifying, and using the same, reference being had to the accompanying drawings, in which—

Figure 1 is the plan of an apparatus adapted for casting pipe and similar articles, and Fig. 2 an elevation of the same. Fig. 3 is an isometrical projection of the parts of a pipe-mold detached.

My invention consists in forming pipes and other castings by causing the mold into which the fluid material is poured to revolve with sufficient force to cause it to be thrown out against the sides of the mold, so as to form there a stratum of a thickness regulated by the quantity of fluid material introduced. The mold may be of any required shape and caused to revolve in any convenient way, the mode adapted to the manufacture of pipes being shown in the drawings. This consists of two axles, *a*, placed parallel to each other, and each having near the ends, just inside of the bearings, two wheels, *b*, the periphery of which may be, as shown in the drawings, of angular form. These wheels receive the mold *c* upon them, a groove, *d*, being formed around the mold, in which the wheels run, and holding it steady while revolving. The wheels *b* may be turned by any convenient power, and the velocity may be such as may be required to effect the purpose intended—viz., that of keeping the material out to the inner surface of the mold, thus avoiding in hollow castings the expense of forming a core or the risk of placing it out of the center in casting. By this means I insure in such castings an equal thickness on all sides.

The mold shown is made in the following way: It is divided into two or more parts (see Fig. 3) parallel to the plane of its axis, and onto each end there is a cap fitted, that holds the parts together. These caps have holes through their center at the end. From the hole in *e'* a short tube, *f*, projects, which is the size of the interior bore of the mold. Opposite this tube, when the mold is put together, the interior is enlarged, as shown at *h*. This is intended to form pipes for fitting together in the usual way. For some purposes it may be omitted. *i i* are the handles by which the mold is removed. The character of the mold may be varied to suit the kind of casting to be made.

The operation is as follows: After the mold is put together it is set in motion on its own axis. The fluid material is poured through one of the holes in the center of the caps, as before mentioned. It is immediately forced outward by centrifugal force and coats the whole interior of the mold to a thickness regulated by the amount of fluid material poured in. The motion is kept up until the material chills or sets sufficiently to retain its form. It is then stopped, the caps knocked off, the molds separated, and the casting removed.

Having thus described my improvement, what I claim therein as new, and desire to secure by Letters Patent, is—

Forming pipes or other castings by centrifugal force by causing the mold into which the liquid material is poured to revolve.

The above specification signed and witnessed this 16th day of February, A. D. 1858.

T. J. LOVEGROVE.

Witnesses:
FRANCIS GUDGIN,
CHAS. F. STANSBURY.